(12) United States Patent
Fagerland

(10) Patent No.: US 12,384,623 B2
(45) Date of Patent: Aug. 12, 2025

(54) METHOD AND SYSTEM FOR AUTONOMOUS CONTROLLING OF MOVEMENTS OF CONTAINER HANDLING VEHICLES OPERATING IN AN AUTOMATED STORAGE AND RETRIEVAL SYSTEM

(71) Applicant: Autostore Technology AS, Nedre Vats (NO)

(72) Inventor: Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 800 days.

(21) Appl. No.: 17/625,945

(22) PCT Filed: May 29, 2020

(86) PCT No.: PCT/EP2020/064940
§ 371 (c)(1),
(2) Date: Jan. 10, 2022

(87) PCT Pub. No.: WO2021/008766
PCT Pub. Date: Jan. 21, 2021

(65) Prior Publication Data
US 2022/0258978 A1 Aug. 18, 2022

(30) Foreign Application Priority Data
Jul. 12, 2019 (NO) .................................. 20190884

(51) Int. Cl.
*B65G 1/137* (2006.01)
*B65G 1/04* (2006.01)
*G05D 1/00* (2024.01)

(52) U.S. Cl.
CPC .......... *B65G 1/1373* (2013.01); *B65G 1/0464* (2013.01); *G05D 1/0223* (2013.01); *G05D 1/0274* (2013.01); *G05D 1/0287* (2013.01)

(58) Field of Classification Search
CPC .... B65G 1/0464; B65G 1/0478; B65G 1/065; B65G 1/1373; B65G 1/0421; G05D 1/0289; G05D 1/02; G05D 1/693; B66F 9/063
See application file for complete search history.

(56) References Cited

U.S. PATENT DOCUMENTS

| | | |
|---|---|---|
| 2009/0271034 A1 | 10/2009 | Kalbavi et al. |
| 2011/0184605 A1 | 7/2011 | Neff |

(Continued)

FOREIGN PATENT DOCUMENTS

| | | |
|---|---|---|
| EP | 3192751 A1 | 7/2017 |
| EP | 3997536 B1 | 9/2023 |

(Continued)

OTHER PUBLICATIONS

International Search Report issued in PCT/EP2020/064940 on Jul. 7, 2020 (5 pages).

(Continued)

*Primary Examiner* — Timothy R Waggoner
(74) *Attorney, Agent, or Firm* — Baker Botts L.L.P.

(57) ABSTRACT

A storage and retrieval system includes a grid structure with storage columns and a corresponding rail system above the storage columns for guiding movements of the vehicles adapted for transferring storage containers to and from the storage columns. Each vehicle includes a vehicle controller connected to driving unit and sensors for controlling movements of the vehicle along the rail system relative to movements of other vehicles. A method for autonomous controlling movements of the vehicles, performed in the (Continued)

vehicle controller of each vehicle, includes: a) using a map defining rail layout and traffic rules for where and when vehicles can move on the rail system, and wherein the map is the same for all vehicles operating in the storage and retrieval system; b) synchronizing the vehicle controller to a clock common for all vehicles; c) receiving an instruction from a master controller instructing the vehicle to move to a specified destination on the rail system relative to the map; d) letting the vehicle controller determine a route to follow on the rail system from a current position of the vehicle to the specified destination based on the map, the traffic rules, distance to other vehicles and movements of the other vehicles; e) controlling the movements of the vehicle along the rails system from the current position of the vehicle to the specified destination according to the determined route; and f) repeating steps d) and e) until the vehicle has reached the specified destination.

7 Claims, 3 Drawing Sheets

(56) References Cited

U.S. PATENT DOCUMENTS

| | | | |
|---|---|---|---|
| 2018/0276608 A1* | 9/2018 | Stadie | G05B 19/41895 |
| 2019/0092570 A1 | 3/2019 | MacDonald et al. | |
| 2021/0032034 A1* | 2/2021 | Kalouche | B25J 9/1612 |
| 2022/0258978 A1 | 8/2022 | Fagerland | |

FOREIGN PATENT DOCUMENTS

| | | |
|---|---|---|
| NO | 317366 B1 | 10/2004 |
| WO | 2014/090684 A1 | 6/2014 |
| WO | 2015/185628 A2 | 12/2015 |
| WO | 2016/014917 A1 | 1/2016 |
| WO | 2017/186825 A1 | 11/2017 |
| WO | 2018/082972 A1 | 5/2018 |
| WO | 2021008766 A1 | 1/2021 |

OTHER PUBLICATIONS

Written Opinion of the International Searching Authority issued in PCT/EP2020/064940 on Jul. 7, 2020 (10 pages).
International Preliminary Report on Patentability from PCT/EP2020/064940 mailed on Aug. 6, 2021 (15 pages).
Norwegian Search Report issued in No. 20190884 mailed on Feb. 11, 2020 (3 pages).
Schwab, M.; "A Decentralized Control Strategy for High Density Material Flow Systems with Automated Guided Vehicles"; KIT Scientific Publishing, Jan. 1, 2015 (165 pages).
Anonymous, Request for the Submission of an Opinion in Korean Application No. 10-2022-7004746, dated Mar. 20, 2025, 12 pages (inclusive of translation), Korean Intellectual Property Office, Daejeon, Republic of Korea.
S. Bandaranayake, Office action for Canadian patent application 3146795, dated Feb. 21, 2025, 3 pages, pub. by the Canadian Intellectual Property Office, Gatineau, Quebec, Canada.

* cited by examiner

METHOD AND SYSTEM FOR AUTONOMOUS CONTROLLING OF MOVEMENTS OF CONTAINER HANDLING VEHICLES OPERATING IN AN AUTOMATED STORAGE AND RETRIEVAL SYSTEM

INTRODUCTION

The present invention relates to a method, system and computer program product for controlling movements of vehicles handling storage containers in an automated storage and retrieval system comprising a grid structure and a corresponding rail system for guiding movements of the vehicles. More specifically the invention relates to a method and computer program providing autonomous operation of movements of vehicles handling storage containers in the storage and retrieval system.

BACKGROUND

Storage and retrieval systems are well known. Vehicles operating these are controlled by a central controller, also called master controller, communicating with controllers in each vehicle.

FIG. 1 illustrates a typical prior art automated storage and retrieval system 10 having a framework structure 100 and where container handling vehicles 150, also called robots, are operating the automated storage and retrieval system 10 when running on a rail system 108 on top of the framework structure 100.

The framework structure 100 comprises a plurality of upright members 102 and optionally a plurality of horizontal members 103 supporting the upright members 102. The members 102, 103 may typically be made of metal, e.g. extruded aluminium profiles.

The framework structure 100 defines a storage grid 104 comprising storage columns 105 arranged in vertical rows, in which storage containers 106, also known as bins, are stacked one on top of another to form stacks 107. Each storage container 106 may typically hold a plurality of product items.

The automated storage and retrieval system 10 comprises a rail system 108 for guiding container handling vehicles 150. The rail system 108 is arranged in a grid pattern across the top of the storage grid 104. The container handling vehicles 150 are running on the rail system 108 and are operated to lower and raise storage containers 106 into and from the storage columns 105 as well as transporting the storage containers 106 on the rail system 108. The horizontal extent of a storage column 105 is defined by a grid cell 122 marked by thick lines in FIG. 1. The grid cells 122 define the layout of the rail system 108.

The rail system 108 comprises a first set of parallel rails 110 arranged to guide movement of the container handling vehicles 150 in a first direction X across the top of the framework structure 100, and a second set of parallel rails 111 arranged perpendicular to the first set of rails 110 to guide movement of the container handling vehicles 150 in a second direction Y which is perpendicular to the first direction X. In this way, the rail system 108 defines grid columns above which the container handling vehicles 150 can move laterally above the storage columns 105, i.e. in a plane which is parallel to the horizontal X-Y plane.

Each container handling vehicle 150 comprises a vehicle body and a wheel arrangement of eight wheels where a first set of four wheels enable the lateral movement of the container handling vehicles 150 in the X direction and a second set of the remaining four wheels enable the lateral movement in the Y direction. One or both sets of wheels in the wheel arrangement can be lifted and lowered, so that the first set of wheels and/or the second set of wheels can be engaged with respective set of rails 110, 111, where this is defined by a controller controlling driving means in the container handling vehicle 150 for controlled directional movements of the container handling vehicle 150.

Each container handling vehicle 150 further comprises a lifting device (not shown) for vertical transportation of storage containers 106, e.g. raising a storage container 106 from, and lowering a storage container 106 into, a storage column 105. The lifting device comprises one or more gripping/engaging devices (not shown) adapted for engaging a storage container 106. The gripping/engaging devices can be lowered from the vehicle 150 by the lifting device for adjusting the position of the gripping/engaging devices in a third direction Z which is orthogonal the first and second directions X, Y.

Each container handling vehicle 150 comprises a storage compartment or space (not shown) for receiving and stowing a storage container 106 when transporting the storage container 106 across the rail system 108. The storage space may comprise a cavity arranged centrally within the vehicle body, e.g. as is described in WO2014/090684A1, the contents of which are incorporated herein by reference.

Alternatively, the container handling vehicles 150 may have a cantilever construction, as is described in NO317366, the contents of which are al so incorporated herein by reference.

In a storage grid 104, most of the grid columns are storage columns 105, i.e. grid columns 105 where storage containers 106 are stored in stacks 107. However, a storage grid 104 normally has at least one grid column which is not used for storing storage containers 106, but instead is used by the container handling vehicles 150 for dropping off and/or picking up storage containers 106 so that they can be transported to a second location (not shown) where the storage containers 106 can be accessed from the outside of the storage grid 104 or transferred out of or into the storage grid 104. Within the art, such a location is normally referred to as a "port" and the grid column in which the port is located may be referred to as a "delivery column" 119. The drop-off and pick-up ports of the container handling vehicles 150 are referred to as the "upper ports of a delivery column" 119. While the opposite end of the delivery column is referred to as the "lower ports of a delivery column".

The storage grids 104 in FIG. 1 comprise two delivery columns 119 and 120. The first delivery column 119 may for example comprise a dedicated drop-off port where the container handling vehicles 150 can drop off storage containers 106 to be transported through the delivery column 119 and further to an access or a transfer station (not shown), and the second delivery column 120 may comprise a dedicated pick-up port where the container handling vehicles 150 can pick up storage containers 106 that have been transported through the delivery column 120 from an access or a transfer station (not shown). Each of the ports of the first and second delivery column 119, 120 may comprise a port which is suitable for both pick-up and drop-off storage containers 106.

The second location, where a storage container 106 can be accessed from the outside of the storage grid 104, may typically be a picking or a stocking station where product items are removed from or positioned into the storage containers 106. In a picking or a stocking station, the storage containers 106 are normally never removed from the automated storage and retrieval system 10 but are returned into the storage grid 104 once accessed. For transfer of storage containers out of, or into the storage grid 104, there are also lower ports provided in a delivery column. Such lower ports are for example used for transferring storage containers 106 to another storage facility (e.g. to another storage grid), directly to a transport vehicle (e.g. a train or a lorry), or to a production facility.

For monitoring and controlling the automated storage and retrieval system 10, the system comprises a central control system (not shown) which typically is computerized and comprises a database for keeping track of the location of the storage containers 106 as well as which storage container 106 to be handled at any time, i.e. which storage container 106 to be retrieved or stored in the storage grid 104. In addition to this, the control system monitors and controls the positions and movements of each container handling vehicle 150 operating on the storage grid 104. In this way, each container handling vehicle 150 receives movement instructions from the central control system for transporting a specific storage container 106 from one location to another location without colliding with each other.

For controlling the traffic flow of the container handling vehicles 150 operating on the storage grid 104, the control system must at all time have an updated overview of positions and movements of all container handling vehicles 150.

When a storage container 106 stored in the storage grid 104 disclosed in FIG. 1 is to be accessed, a control system may for instance instruct one of the container handling vehicles 150 to retrieve the storage container 106 from its current location in the storage grid 104 and to transport it to or through the first delivery column 119. This operation involves moving the container handling vehicle 150 to a grid location above the storage column 105 in which the target storage container 106 is located, retrieving the storage container 106 from the storage column 105 using the container handling vehicle's lifting device (not shown), and transporting the storage container 106 to the first delivery column 119. If the target storage container 106 is located deep within a stack 107, i.e. with one or a plurality of other storage containers stacked above the target storage container 106, the operation will include temporarily moving the storage containers 106 above the target storage container 106 prior to lifting the target storage container 106 from the storage column 105. This step, which is sometimes referred to as "digging" within the art, may be performed with the same container handling vehicle 150 that is subsequently used for transporting the target storage container 106 to the delivery column, or with one or a plurality of other cooperating container handling vehicles 150. Alternatively, or in addition, the automated storage and retrieval system 10 may have container handling vehicles 150 specifically dedicated to the task of temporarily removing storage containers 106 from a storage column 105. Once the target storage container 106 has been removed from the storage column 105, the temporarily removed storage containers 106 can be repositioned into the original storage column 105 or alternatively be relocated to other storage columns 105.

When a storage container 106 is to be stored in the storage grid 104, one of the container handling vehicles 150 is instructed to pick up the storage container 106 from the second delivery column 120, shown in FIG. 1, and to transport it to a grid location above the storage column 105 where it is to be stored. After any storage containers 106 positioned at or above the target position within the storage column stack 107 have been removed, the container handling vehicle 150 places the storage container 106 at the desired location. The removed storage containers 106 may then be lowered back into the storage column 105 or relocated to other storage columns 105.

In addition to the storage and retrieval system 10 described above with reference to FIG. 1, the applicant has also developed a storage and retrieval system where container handling vehicles 150 are operating both above and below the storage grid 104. Container handling vehicles operating below the storage grid 104 are called drones. A solution including drones improves the efficiency when handling storage containers 106 but will require more communication to and from a central control system and all container handling vehicles 150.

The current AutoStore system is controlled by a master controller transmitting operation and movement instructions to all container handling vehicles 150 for controlling all movements and operations on a storage and retrieval system 10. For doing so, the master controller will at all time have a total overview of the locations of all vehicles 150 operating the storage and retrieval system 10 as well as the locations of all storage containers 106. The master controller instructs each vehicle 150 to store or retrieve storage containers 106. The current position of each vehicle is continuously communicated from a vehicle 150 to the master controller, thus enabling it to control the movements of all vehicles 150 on the rail system 108 in an optimal way without vehicles 150 queuing or colliding.

In current solutions, this requires continuous radio communication with each container handling vehicle 150. In larger systems, comprising a plurality of vehicles 150, the amount radio communication can be massive and vulnerable to noise etc. Another problem is that the framework structure 100 itself may obscure for communication signals. This is particularly a problem if there are container handling vehicles 150 operating below the grid 104, i.e. drones.

The present invention alleviates said problems by a method and computer program product requiring reduced radio traffic between a master controller and container handling vehicles 150 operating on and handling storage containers 106 of a storage and retrieval system 10.

By letting all vehicles 150 operating a storage and retrieval system 10 make autonomous movement decisions, a master controller only needs to assign tasks to the vehicles and each vehicle will choose the best route to follow along the rail system 108 from its current position to a destination. This will dramatically reduce the radio communication between each container handling vehicle 150 and a master controller as well as the complexity of central processing.

There are however challenges when using vehicles making autonomous movement decisions for movements on a rail system 108. Since a grid 104 is dense and other vehicles 150 may block the view for a vehicle 150, it is difficult to predict movements of other vehicles 150. With distance sensors, it is easy to follow another vehicle, but it can still be difficult to cross lanes when traffic is dense, and the speed of other vehicles 150 is potentially relatively high. This runs the risk that some vehicles are retained, i.e. not being let into a trafficked "main road" from port positions due of high traffic load. These aspects are also addressed and solved by the present invention.

SHORT DESCRIPTION OF THE INVENTION

The present invention is method, computer program product and system as defined in the main claims and with additional features defined in dependent claims.

More specifically, the invention is defined by a method for autonomous controlling movements of container handling vehicles operating in a storage and retrieval system comprising a grid structure with storage columns and a corresponding rail system above the storage columns for guiding movements of the vehicles adapted for transferring storage containers to and from the storage columns, where each vehicle comprises a vehicle controller connected to driving means and sensors for controlling movements of the vehicle along the rail system relative to movements of other vehicles. The method is characterized in performing the following steps in the vehicle controller of each vehicle:

a) using a map defining rail layout and traffic rules for where and when vehicles can move on the rail system, and where the map is the same for all vehicles operating in the storage and retrieval system;
b) synchronizing the vehicle controller to a clock common for all vehicles;
c) receiving an instruction from a master controller instructing the vehicle to move to a specified destination on the rail system relative to the map;
d) letting the vehicle controller determine a route to follow on the rail system from a current position of the vehicle to the specified destination based on the map, the traffic rules, distance to other vehicles and movements of the other vehicles;
e) controlling the movements of the vehicle along the rails system from its current position to the specified destination according to the determined route, and
f) repeating steps d) and e) until the vehicle has reached the specified destination.

According to one embodiment of the invention the rail layout in the common map is defined according to two-dimensional coordinates corresponding to the grid cells defined by the circumference of the horizontal extent of storage columns of the storage and retrieval system and traffic rules are defined for each grid cell and its corresponding rails.

This means that each grid cell is uniquely defined. Since every vehicle operating the storage and retrieval system are using the same map defining rules for movements, a vehicle controller in each vehicle can control the vehicles along the rail system without colliding with other vehicles.

The common map comprises a set of traffic rules for each grid cell and its corresponding rails. Different sets of traffic rules may be used for different grid cells. A common map may for instance define a series of connected cells as a "main road", while cells connected to the "main road" are defined as "side roads". The map may further define some grid cells as only "one-way traffic" in a specific direction. Another rule may be that one or more specified grid cells are not to be used, i.e. no passing or stopping on the grid cell. Yet another rule may be that a grid cell is defined as speed restricted, i.e. only to be passed at a set maximum speed.

When different traffic rules are combined, a detailed common map can be followed by every container handling vehicle operating on the same rail system. Each vehicle will follow the different rules according to their current location.

In addition to the set of common traffic rules, different sets of traffic rules may be applied for certain time slots. In this way a traffic pattern can be changed according to for instance specific needs and time of day.

The current position of each vehicle can be determined in different ways. One way is by determining the position by detecting number of rail crossings passed and in which directions the track crossings are passed from an initial position. The initial position can be acquired by external means detecting the current position of all vehicles, preferably when all vehicles are halted which typically is when starting up the system or resetting it.

As mentioned, one step of the method is synchronizing the vehicle controller of each vehicle to same common clock.

Each vehicle is instructed to move to a specified destination relative to the common map. At the destination, the vehicle will perform tasks such as for instance retrieving or storing a storage container.

When each vehicle has received instructions comprising a destination grid cell, the vehicle controller determines a route to follow from the current position of the vehicle to the specified destination based on the common map. The vehicle controller will plan and make the route according to the traffic rules and distance to other vehicles.

The vehicle controller may adjust and/or change the speed and movements of the vehicle according to the traffic rules, distance to and movements of other vehicles.

The vehicle controller may further adjust and/or change a set route of a vehicle according to the vehicle's current position and distance to and movements of other vehicles.

When all vehicles are synchronized to the same common clock, they are controlled according to the common map and all movements will run smoothly without having to be continuously controlled by a master controller. This will dramatically reduce communication between vehicles and a master controller as well as the complexity of the central processing.

The method according to the invention can be performed in different types of vehicles, such as robots and drones, operating in a storage and retrieval system. It is especially well suited in a system where both robots and drones are cooperating when handling storage containers. Robots are autonomous vehicles operating on top of the storage and retrieval system while drones are autonomous vehicles operating at a level below the vehicles or below the grid structure of the storage and retrieval system.

Vehicles running on the same level must follow the same common map. Since robots and drones are operating on different levels they may follow maps defining different traffic rules.

The invention is further defined by a computer program product comprising instructions that when executed in a processor of a vehicle controller comprised in an autonomous container handling vehicle performs the method described above for handling storage containers in a storage and retrieval system.

The invention is further defined by a system for autonomous controlling movements of container handling vehicles operating in a storage and retrieval system comprising a grid structure with storage columns and a corresponding rail system above the storage columns for guiding movements of the vehicles adapted for transferring storage containers to and from the storage columns, where each vehicle comprises a vehicle controller connected to driving means and sensors for controlling movements of the vehicle along the rail system relative to movements of other vehicles, where the system comprises a master controller adapted for communicating with vehicle controllers in each vehicle.

The master controller is adapted for:
transmitting a map to the vehicle controller of all vehicles operating in the storage and retrieval system, where the map defines rail layout and traffic rules for where and when vehicles can move on the rail system, and where the map is the same for all the vehicles;

transmitting a synchronization signal to all the vehicle controllers such that they are synchronized to a clock common for all vehicles;

each vehicle controller is adapted for:
  receiving an instruction from a master controller instructing the vehicle to move to a specified destination on the rail system relative to the map;
  determining a route to follow on the rail system from a current position of the vehicle to the specified destination based on the map, the traffic rules, distance to other vehicles and movements of the other vehicles;
  controlling the movements of the vehicle along the rails system from its current position to the specified destination according to the determined route.

DETAILED DESCRIPTION OF THE INVENTION

Embodiments of the invention will now be described in greater detail and by way of example only with reference to the figures where:

Figure 1:
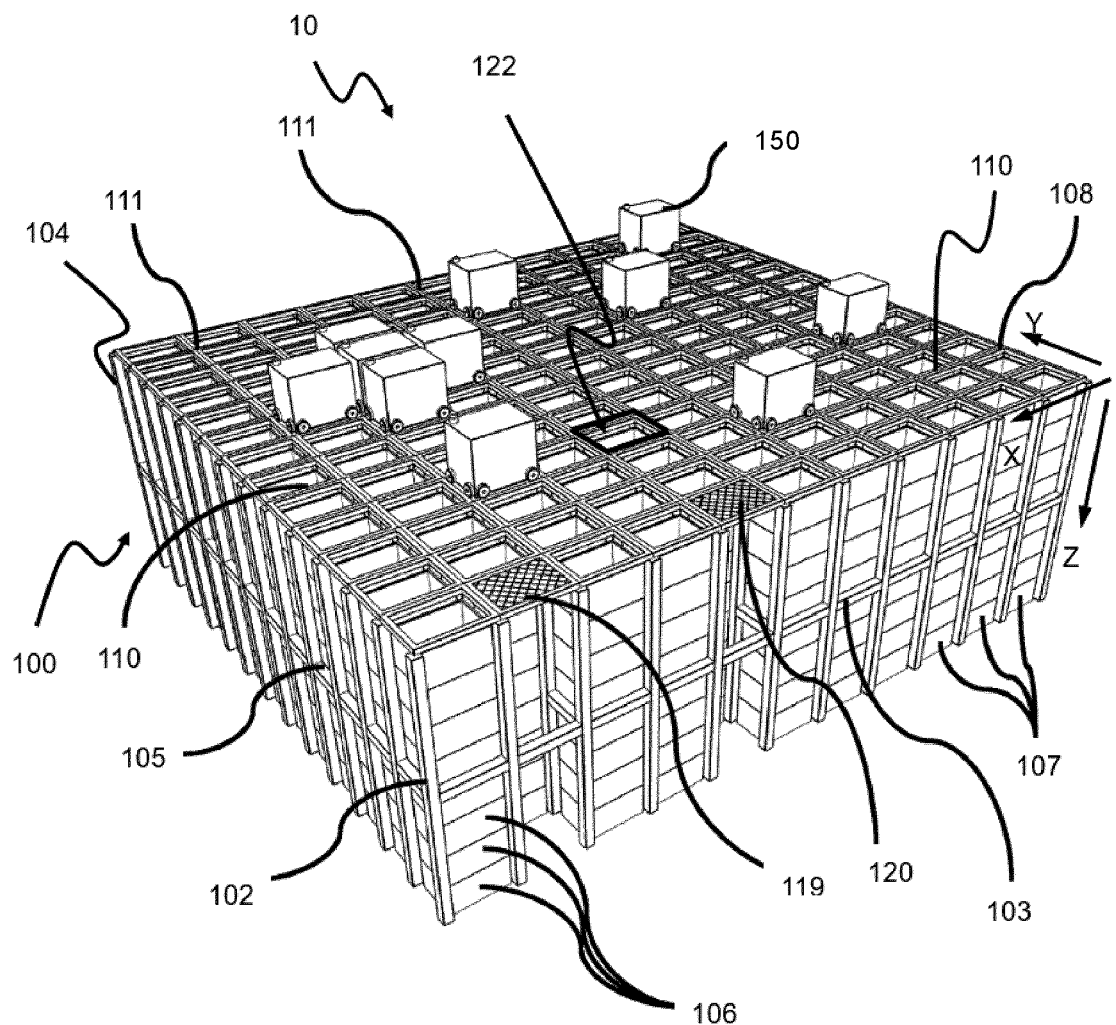
FIG. 1 shows a typical prior art automated storage and retrieval system where container handling vehicles are handling storage containers.

As described above with reference to FIG. 1, vehicles operating in prior art storage and retrieval system are controlled by a master controller having a total overview of movements of all vehicles at any time. In larger systems with a plurality of vehicles, having this total overview requires massive continuous communication between the master controller and the vehicles making signals prone to disturbances and possible through loss of signals.

The present invention addresses and solves this problem by a method, system and computer program product enabling each vehicle to control its own movements relative to movements of other vehicles.

Figure 2:
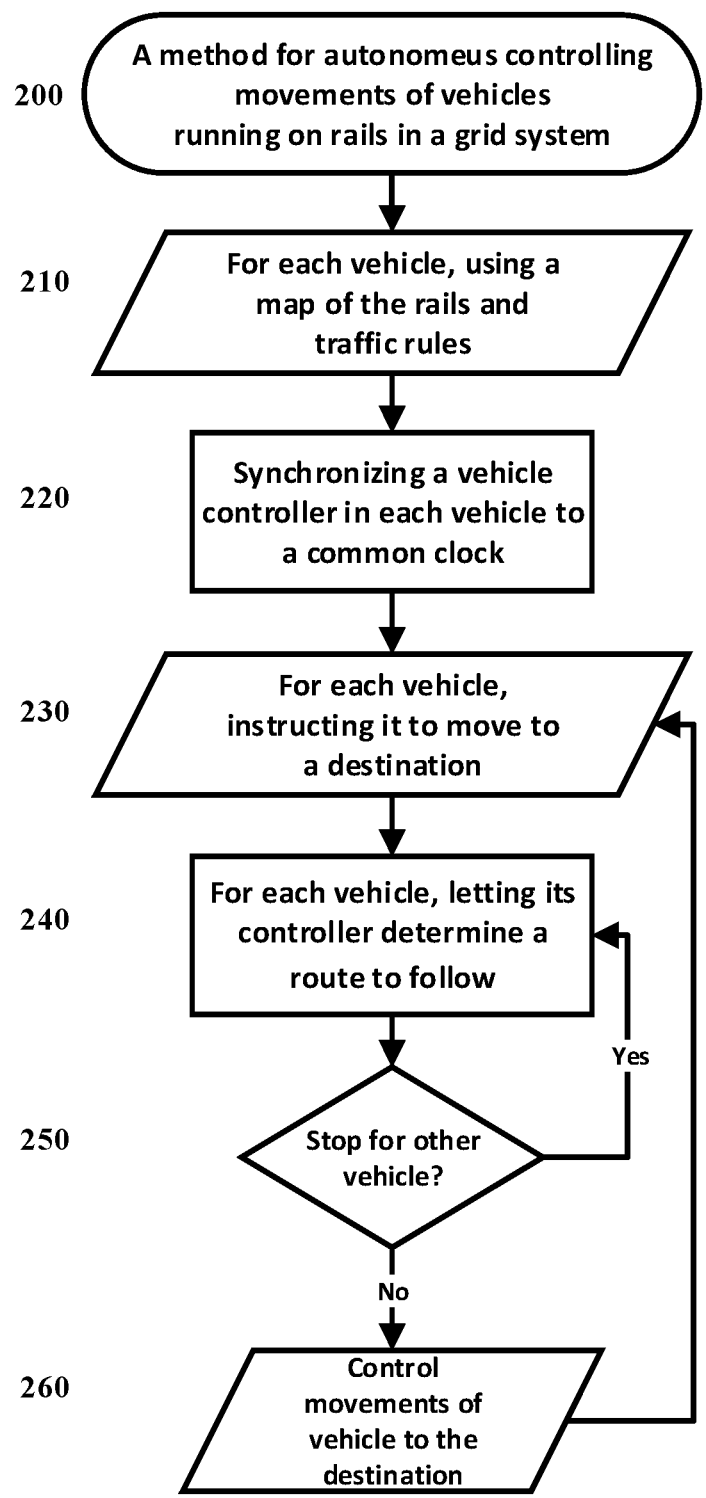
FIG. 2 is a flow chart illustrating the different steps involved when performing the method according to the invention.

FIG. 2 illustrates the different steps performed in the method for autonomous controlling movements of vehicles running on rails in a grid system 200.

Figure 4:
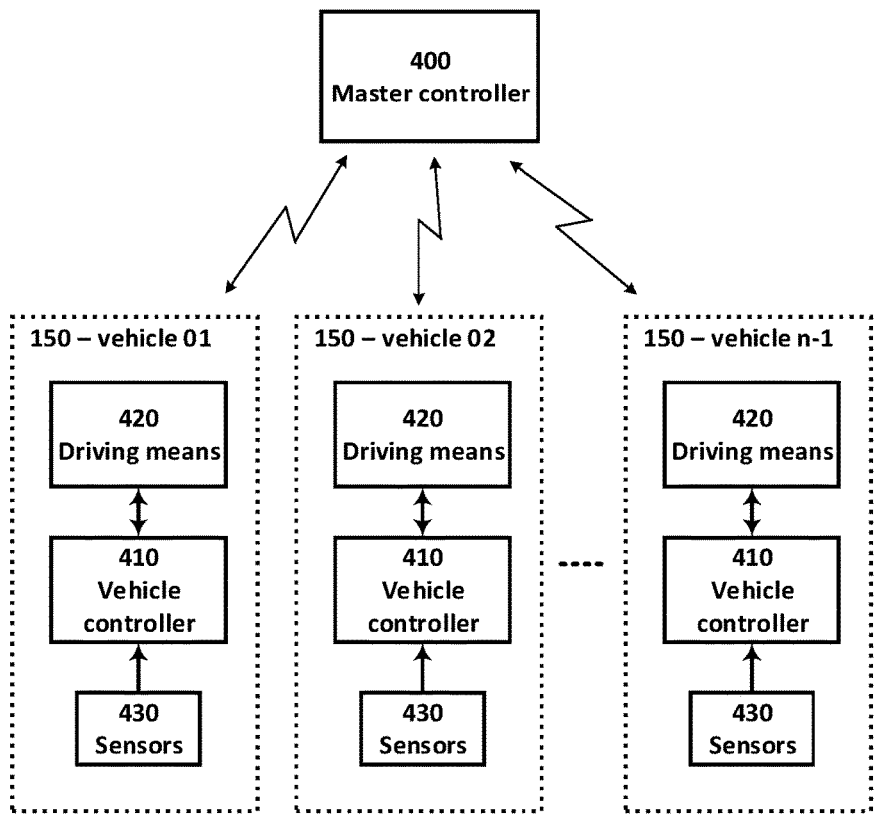
FIG. 4 illustrates vehicle controllers, driving means and sensors of each vehicle enabling autonomous controlling of movements of container handling vehicles.

As described above, the container handling vehicles 150 operate in a storage and retrieval system 10 comprising a grid structure with grid cells 122 and corresponding rail system 108 for guiding movements of the vehicles for transferring storage containers to and from the grid cells 122. Each vehicle 150 comprises a vehicle controller 410 (ref. FIG. 4) connected to driving means 420 and sensors 430 for controlling movements of the vehicle 150 along the rail system 108 relative to movements of other vehicles 150. The vehicle controller 410 are signal connected to a master controller 400 for exchanging information.

According to the invention, the method for autonomous controlling movements of vehicles 150 running on rails in a grid system 200 comprises different steps performed in the vehicle controller 410 of each vehicle 150.

The first step 210 is using a map defining rail layout and traffic rules for the rail system 108. Each vehicle will be provided with the same map with information of rail layout of the storage and retrieval system and the same traffic rules defining where and when vehicles can move on the rails. Examples of traffic rules will be described below with reference to FIG. 3.

The map can be provided to each vehicle 150 in different ways. When setting up a new storage and retrieval system each vehicle operating on the system may have the map pre-installed in a non-volatile memory connected to its controller. Updated versions of the map may be transmitted to and installed in each vehicle 150 after they are operative.

In addition to track layout of the rail system 108 and traffic rules for each grid cell 122, the common map also defines time slots for each grid cell 122 defining time intervals where different traffic rules are valid for each grid cell 122. Each time slot can define "virtual traffic lights" for movements on each grid cell 122, e.g. a "green traffic light" means that a vehicle 150 can move, while a "red traffic light" means that a vehicle 150 must wait. For this to work all vehicles must operate according to same time reference, i.e. a common clock.

The second step 220 of the method is to synchronize clocks in vehicle controllers 410 of each vehicle according to a common clock. When said first 210 and second steps 220 are executed, all vehicles 150 are prepared for normal operation and for receiving instructions comprising information adapted for each vehicle, e.g. which grid cell 122 to move to and which task to perform. The task may for instance be to pick up a specific storage container 106 stored in a storage column 105 corresponding to the grid cell 122 it is instructed to move to.

The next steps are repeated and performed during normal operation, that is when all vehicle controllers 410 have been provided with the common map and their clocks are synchronized.

During normal operation each vehicle controller 410 will receive instructions from the master controller 400 comprising which destination grid cell 122 it shall move to and which operation it shall perform. This is illustrated by step 230 in FIG. 2. When a vehicle controller 410 has received this information, the next step 240 is letting the vehicle controller 410 in the vehicle 150 determine the route the vehicle 150 shall take on the rail system 108 from its current location to the destination grid cell 122. All movements along the tracks are made according to the common map.

During its movements along the tracks it is constantly checked, ref. step 250, if other vehicles are too close or will become to close and whether it should stop. How close a vehicle is to another vehicle can be determined by distance sensors installed in the vehicle. By constantly detecting and updating current distance to other vehicles 150, their movements can be determined, e.g. how fast they are running, if they are moving away from or towards the determined route of the vehicle 150.

If it is decided that it must stop, step 240 is re-entered and a route is once again determined. This may be a new route or the same route that the vehicle 150 previously followed and where the same route has been cleared after the stop.

If it is decided that the vehicle 150 can follow a determined route to the destination grid cell 122 without stopping, ref. step 260, the vehicle controller 410 will control the vehicle 150 to drive to the destination grid cell 122 and perform its instructed operation. It is then ready to receive new instructions or plan a new route to another destination grid cell 122 according to previously received instructions.

When each container handling vehicle 150 comprises a synchronized controller (with clocks synchronized to same common clock) and sensor means for determining its position and distance to other container handling vehicles 150 and is controlled according to the same common map defining traffic rules, the vehicles will move safely without having to be controlled by an external master controller.

Drones operating below the storage and retrieval system 10 have no digging activities and typically have a less dense grid. A set of traffic rules for drones may therefore be simpler than traffic rules defined for vehicles 150 operating on top of the storage and retrieval system. When using both vehicles 150 and drones for operating a storage and retrieval system, radio access points are provided both above and below the grid structure. By using vehicles controlled according to the method described above, less radio access points are required due to less need for communication between a master controller and the vehicles.

The virtual time slot-based "traffic lights" and traffic rules in the common map will allow for autonomous traffic decisions of each vehicle 150 when moving from its current location to a destination grid cell 122. This does not require communication with a central controller or other vehicles. The route each vehicle shall take to a destination point is determined by the vehicle controller 410 in each vehicle 150. Guiding the vehicles along the tracks does therefore not require continuous communication with the master controller 400 or with other vehicles.

When a vehicle 150 has arrived at its destination, it will report to the master controller 400 and is then ready to receive new instruction, e.g. the next destination and task to perform.

The invention is further defined by a computer program product comprising instructions that when executed in a processor of a vehicle controller 410 comprised in an autonomous vehicle 150 performs the method described above for controlling movements of container handling vehicles 150 in a storage and retrieval system 10.

Figure 3:
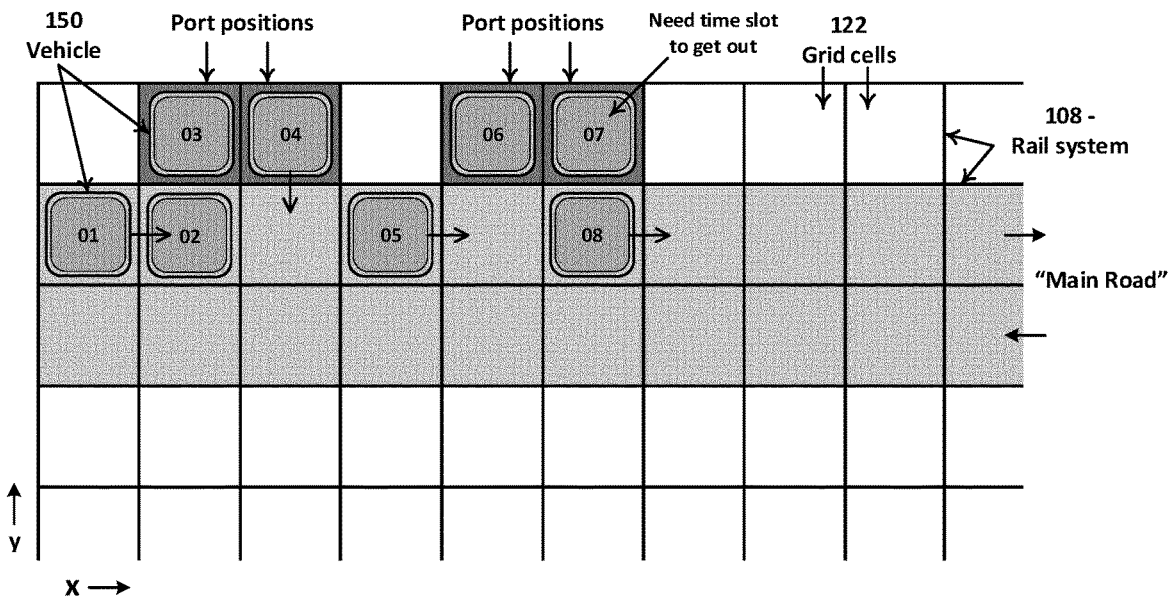
FIG. 3 shows an example of movements of vehicles according to a map.

FIG. 3 illustrates an example of movements of vehicles 150 according to a central map defining traffic rules. Different traffic rules may be applied to each grid cell 122, e.g. speed limits; that a vehicle 150 can pass the grid cell 122 but not stop on it; that a vehicle can only pass in a defined direction, etc.

The map only shows a part of the rail system 108 on top of each grid cell 122 on top of the grid 104 of the retrieval and storage system 10. Each vehicle 150 in the figure is a container handling vehicle 150 identified by a number, i.e. 01 to 08. The map shows a series of grid cells 122 defined as a "Main Road" in each x-direction. This means that these grid cells 122 are used as the main transport route for the container handling vehicles 150.

Vehicles 150 marked as 01, 02, 05 and 08 are driving on the main transport route, i.e. the "Main Road". Since traffic rules are applied to each grid cell 122 at specific time slots, a specific time slot will define "traffic lights" for the grid cells 122 and thus the traffic situation for vehicles 150.

To access the "Main Road", vehicles 150 marked as 03, 04, 06 and 07 located above port positions will need a time slot having a "green traffic light" for entering a grid cell 122 on the main road by moving in the y-direction and the grid cell 122 they are moving to must not be occupied by another vehicle 150.

The figure illustrates one specific time slot where vehicle 04 has a "green traffic light" for moving in the y-direction onto the grid cell 122 on the "Main Road" while vehicles 01 and 02 already moving one the "Main Road" has a "red traffic light" and must stop on their current grid cell 122. Vehicle 04 can then move onto the "Main Road".

Vehicles 06 and 07 are currently busy with operations at their port positions and are thus not moving on the rails even if they have "green traffic lights". When the vehicles 06 and 07 are ready to move to another grid cell 122, they must first wait for a time slot having "green traffic light" in the direction they are to drive.

FIG. 4 illustrates that each vehicle 150 comprises a vehicle controller 410 connected to driving means 420 and sensors 430 for autonomous controlling of movements of container handling vehicles. Each vehicle controller 410 is in communication with a master controller 400 for receiving operation instructions and for responding to the operation instructions.

According to the present invention, vehicles 150 operating in a storage and retrieval system 10 each receive a command from a master controller 400 comprising a grid cell 122 the vehicle 150 shall move to without any further information about which route or speed to follow. Based on the common map defining traffic rules and its distance sensors, each vehicle 150 makes its own decisions about which route to follow and at which speed. A vehicle can change or optimize its current route on its way to the destination position, e.g. grid cell 122. A new route may be planned if a current route is blocked. All vehicles will move safely when their vehicle controllers are time synchronized, follow the same common map which defines the traffic rules for each grid cell 122 and when they are using the distance sensors for continuously updating current distance to other vehicles 150.

The context used when describing the invention above is the AutoStore storage and retrieval system which can consist of traditional AutoStore grids where container handling vehicles operate on top of a retrieval and storage grid, as well grids for drone traffic which operate at a lower level of or below the retrieval and storage grid. The grids for drone traffic typically connect multiple AutoStore grids but may also be used for transportation to picking-stations or external handling.

The invention claimed is:

1. A method for autonomous controlling movements of container handling vehicles operating in a storage and retrieval system comprising a grid structure with storage columns and a corresponding rail system above the storage columns for guiding movements of the vehicles adapted for transferring storage containers to and from the storage columns, wherein each vehicle comprises a vehicle controller connected to driving means and sensors for controlling movements of the vehicle along the rail system relative to movements of other vehicles, wherein, performed in the vehicle controller of each vehicle, the method comprises:
   a) using a map defining rail layout according to two-dimensional coordinates corresponding to grid cells defined by the circumference of a horizontal extent of storage columns of the storage and retrieval system and defining traffic rules for each grid cell for when the traffic rules are applicable, the traffic rules define for where and when vehicles can move on the rail system, and wherein the map is the same for all vehicles operating in the storage and retrieval system;
   b) synchronizing the vehicle controller to a clock common for all vehicles;
   c) receiving an instruction from a master controller instructing the vehicle to move to a specified destination on the rail system relative to the map;
   d) letting the vehicle controller determine a route to follow on the rail system from a current position of the vehicle to the specified destination based on the map, the traffic rules, distance to other vehicles and movements of the other vehicles;

e) controlling the movements of the vehicle along the rail system from the current position of the vehicle to the specified destination according to the determined route; and f) repeating steps d) and e) until the vehicle has reached the specified destination.

2. The method according to claim 1, wherein the traffic rules comprise one or more of the following: grid cell is only to be used for one way drive in a specified direction; grid cell is not to be used; grid cell can only be passed; grid cell can only be used in a set time slot in a specified direction; and grid cell can only be passed at a specified speed.

3. The method according to claim 1, further comprising determining the position of the vehicle by detecting a number of rail crossings passed and in which directions the rail crossings are passed.

4. The method according to claim 1, further comprising letting the vehicle controller adjust and/or change the speed and movements of the vehicle according to the traffic rules, distance to other vehicles and movements of the other vehicles.

5. The method according to claim 1, further comprising letting the vehicle controller adjust and/or change the route of a vehicle according to the vehicle's current position and distance to other vehicles and movements of the other vehicles.

6. A computer program product comprising instructions that when executed in a processor of a vehicle controller comprised in an autonomous container handling vehicle performs a method for controlling movements of the vehicle in a storage and retrieval system, wherein the storage and retrieval system comprises a grid structure with storage columns and a corresponding rail system above the storage columns for guiding movements of the vehicles adapted for transferring storage containers to and from the storage columns, wherein each vehicle comprises a vehicle controller connected to driving means and sensors for controlling movements of the vehicle along the rail system relative to movements of other vehicles, wherein the method for autonomous controlling movements of the vehicles in the storage and retrieval system, performed in the vehicle controller of each vehicle, comprises:

a) using a map defining rail layout and traffic rules for where and when vehicles can move on the rail system, and wherein the map is the same for all vehicles operating in the storage and retrieval system;

b) synchronizing the vehicle controller to a clock common for all vehicles;

c) receiving an instruction from a master controller instructing the vehicle to move to a specified destination on the rail system relative to the map;

d) letting the vehicle controller determine a route to follow on the rail system from a current position of the vehicle to the specified destination based on the map, the traffic rules, distance to other vehicles and movements of the other vehicles;

e) controlling the movements of the vehicle along the rail system from the current position of the vehicle to the specified destination according to the determined route; and f) repeating steps d) and e) until the vehicle has reached the specified destination.

7. A system for autonomous controlling movements of container handling vehicles operating in a storage and retrieval system comprising a grid structure with storage columns and a corresponding rail system above the storage columns for guiding movements of the vehicles adapted for transferring storage containers to and from the storage columns, wherein each vehicle comprises a vehicle controller connected to driving means and sensors for controlling movements of the vehicle along the rail system relative to movements of other vehicles, wherein the system comprises a master controller adapted for communicating with vehicle controllers in each vehicle, wherein the master controller is adapted for:

transmitting a map to the vehicle controller of all vehicles operating in the storage and retrieval system, wherein the map defines rail layout and traffic rules for where and when vehicles can move on the rail system, and wherein the map is the same for all the vehicles; and transmitting a synchronization signal to all the vehicle controllers such that all the vehicles are synchronized to a clock common for all vehicles; and wherein each vehicle controller is adapted for:

receiving an instruction from the master controller instructing the vehicle to move to a specified destination on the rail system relative to the map;

determining a route to follow on the rail system from a current position of the vehicle to the specified destination based on the map, the traffic rules, distance to other vehicles, and movements of the other vehicles; and controlling the movements of the vehicle along the rail system from the current position of the vehicle to the specified destination according to the determined route.

\* \* \* \* \*